United States Patent [19]
Lippert et al.

[11] Patent Number: 5,439,759
[45] Date of Patent: Aug. 8, 1995

[54] COVER FOR BATTERY CABLE TERMINAL

[75] Inventors: Samuel A. Lippert, Canton; Mark G. Hill, Novi, both of Mich.

[73] Assignee: Yazaki Corporation, Tokyo, Japan

[21] Appl. No.: 334,116

[22] Filed: Nov. 4, 1994

[51] Int. Cl.⁶ .............................................. H01M 2/32
[52] U.S. Cl. .................................. 429/65; 174/138 F; 439/521
[58] Field of Search ................ 429/65, 122; 439/521, 439/522, 892; 174/138 F, 188

[56] References Cited

U.S. PATENT DOCUMENTS

| | | |
|---|---|---|
| 1,808,648 | 6/1931 | Fisher . |
| 1,969,051 | 8/1934 | Thompson . |
| 2,068,452 | 1/1937 | Hansen . |
| 2,110,055 | 3/1938 | Richter . |
| 2,119,294 | 5/1938 | Schaefer . |
| 2,800,522 | 7/1957 | Coleman et al. . |
| 2,906,988 | 8/1959 | Stocking . |
| 3,544,953 | 12/1970 | Shannon . |
| 3,633,154 | 1/1972 | Glantz . |
| 3,663,927 | 5/1972 | Brunes . |
| 4,698,459 | 10/1987 | Drake . |
| 4,778,408 | 10/1988 | Morrison . |
| 4,920,018 | 4/1990 | Turner ................... 429/65 |
| 4,998,894 | 3/1991 | Gronvall . |
| 5,015,543 | 5/1991 | English ................... 429/65 |
| 5,023,154 | 6/1991 | English ................... 429/65 X |
| 5,169,338 | 12/1992 | Dewar et al. ............ 174/138 F X |
| 5,338,898 | 8/1994 | Luciano et al. ......... 174/138 F |
| 5,346,407 | 9/1994 | Hood . |
| 5,346,782 | 9/1994 | Julian ..................... 429/65 |

*Primary Examiner*—Anthony Skapars
*Attorney, Agent, or Firm*—Young, MacFarlane & Wood

[57] ABSTRACT

A hinged, shell-like protective cover is releasably mounted to a flanged, split-ring battery cable terminal. A method of assembling said cover to said battery cable terminal is also described. The cover surrounds the battery cable terminal, providing protection from dirt, water, salt, and other contaminants in the engine compartment of a vehicle. The cover includes a base having an aperture which is adapted to receive a battery post. The base is attached to a lid by an integrally molded hinge which allows the lid to pivot about the base between an open position and a closed position. A locking mechanism is provided to secure the lid to the base in the closed position. A pair of resilient locking arms are formed on the base and are adapted to receive a terminal bolt. A plurality of resilient tabs are formed on the base of the cover and located near the aperture in the base. The resilient tabs interact with a flange on the terminal to secure the terminal to the base.

24 Claims, 5 Drawing Sheets

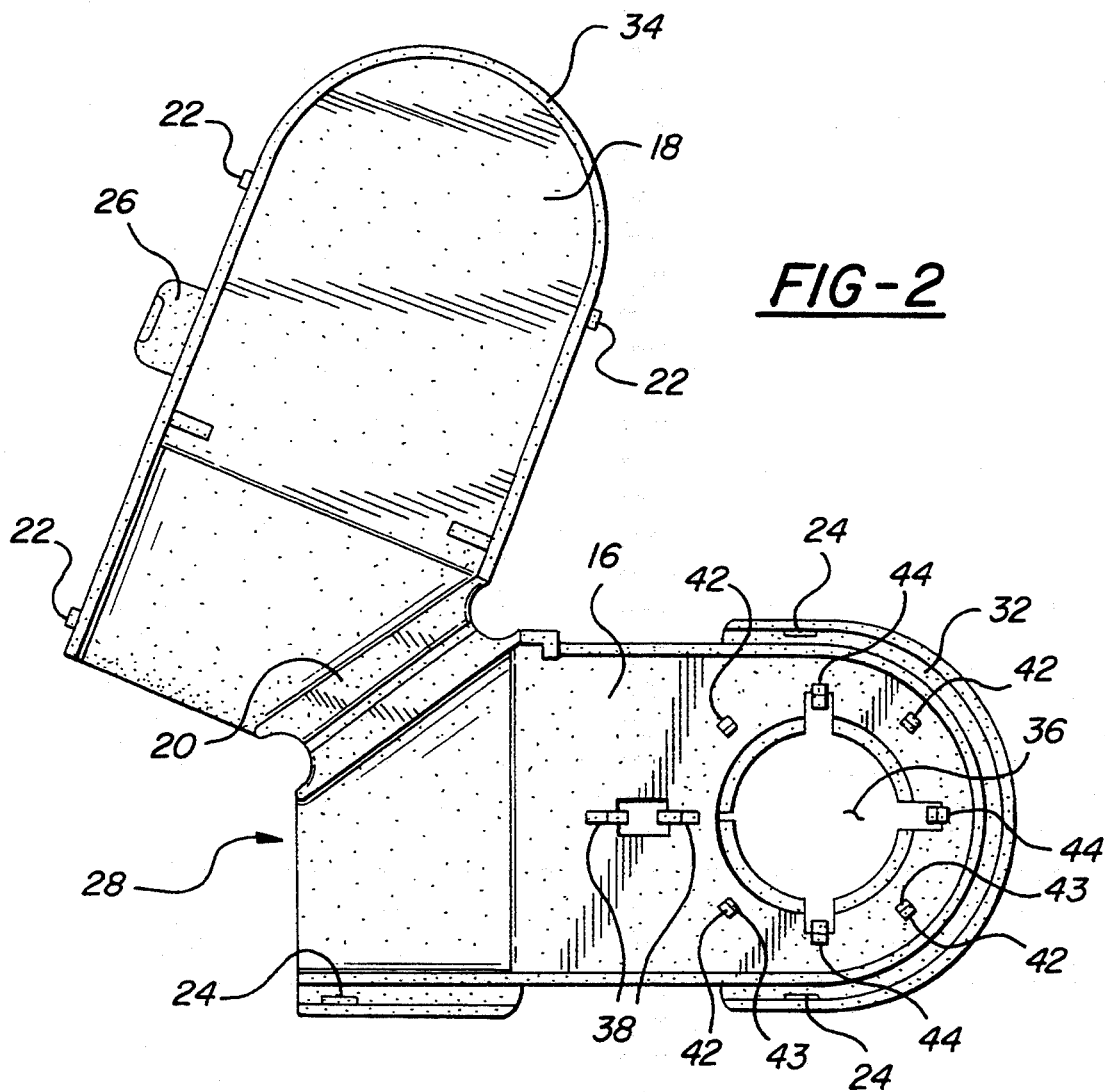

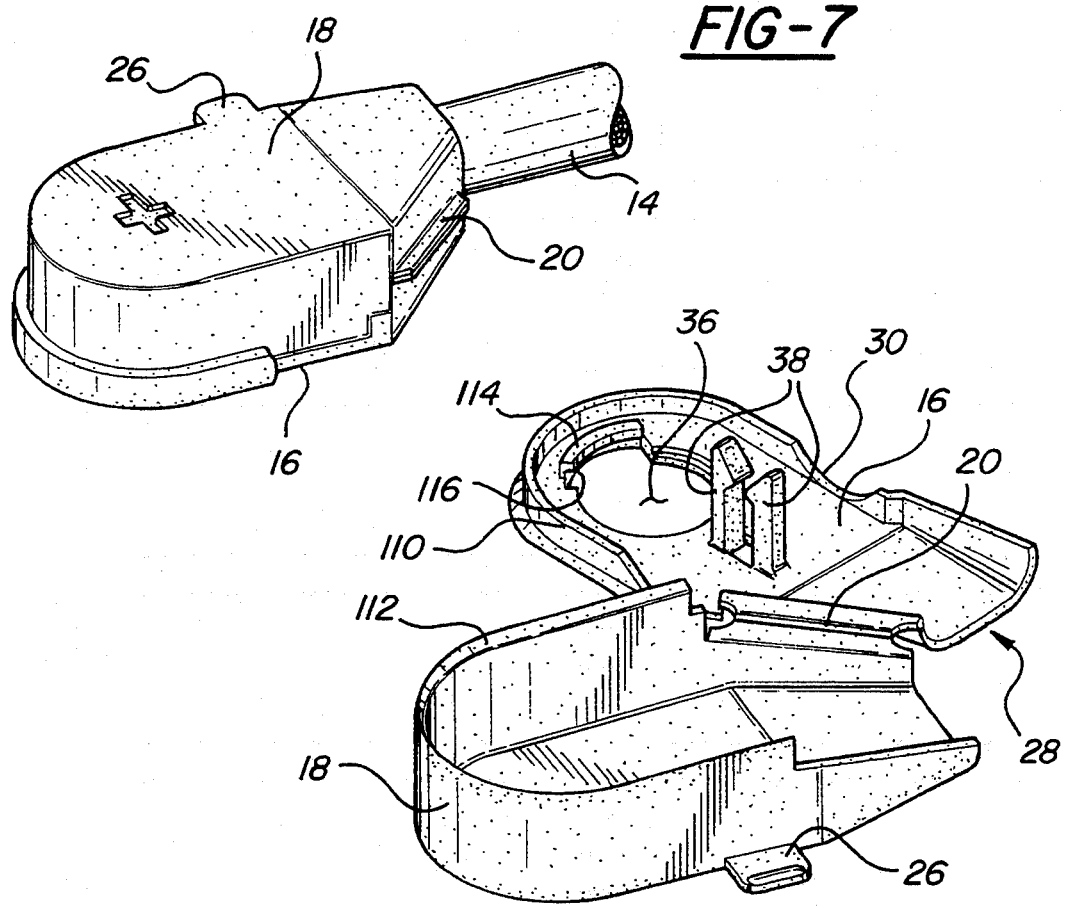
FIG-7
FIG-8
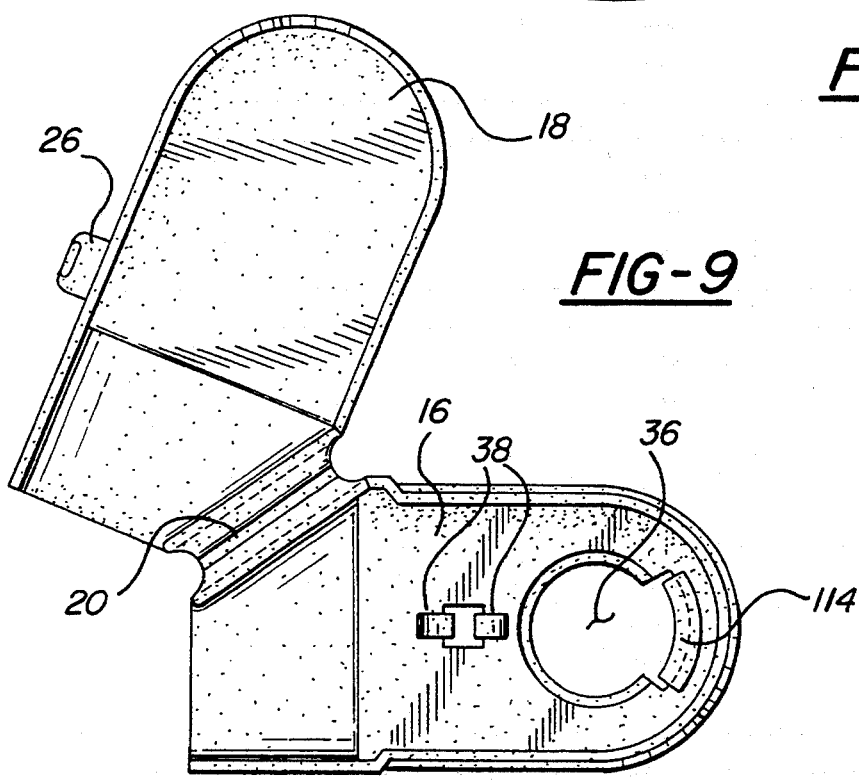
FIG-9

COVER FOR BATTERY CABLE TERMINAL

FIELD OF THE INVENTION

The present invention relates to a hinged, shell-like protective cover for a split-ring battery cable terminal having a substantially circular peripheral flange, and to a method of assembling such a cover to such a terminal.

BACKGROUND OF THE INVENTION

Battery cable terminal covers have been used in vehicles for many years to protect the battery cable terminal and battery post from water, dirt, salt, and other contaminants in the engine compartment. Battery cable terminal covers also protect the battery cable terminal and battery post from accidental electrical shorting.

Known covers are manufactured from materials such as rubber and plastic. Some covers protect only the top and sides of the battery cable terminal; i.e., they do not completely surround the terminal and are easily stretched and deformed, causing the cover to loosen and reduce its ability to protect the terminal. Thus, water, dirt and other contaminants can reach the terminal by traveling between the cover and the top of the battery. Also, the covers do not securely attach to the terminal and can become separated from the terminal due to vibration and inertial forces such as acceleration and deceleration. A loose or separated cover does not adequately protect the terminal from contaminants in the engine compartment and increases the possibility of electrical shorting.

Many known covers are attached to the battery post and held in place by the battery cable terminal. Therefore, these covers are installed during installation of the battery into the vehicle. The covers cannot be attached to the battery cable terminal at some earlier time; e.g., during construction of the battery cable wiring harness, and, therefore, do not protect the terminal during shipment and installation.

Another prior art cover comprises hinged top and bottom sections which are connected by an integral pivot. The bottom section is adapted to receive and be secured to a split-ring cable terminal of the stamped, flange type by urging the flanged terminal forward into a curved retention channel and then closing the top cover section over the bottom section. The cover also provides a large opening to allow the battery cable to enter the cover. The opening is substantially larger than the battery cable, leaving an area for dirt, water and other contaminants to enter the cover. Additionally, the cover does not have any mechanism to prevent overtightening of the split-ring terminal bolt, which can deform the terminal and reduce its ability to grasp the battery post.

SUMMARY OF THE INVENTION

The present invention provides a battery cable terminal cover of the hinged or clamshell type, which effectively encloses the entire terminal, which can be attached to the terminal prior to installation or connection of the terminal to a battery and which allows the terminal to be securely attached to the cover by a simple, unidirectional, rectilinear movement which results in the terminal being held both by the flange and the bolt which is used to tighten and loosen the terminal. Moreover, the cover prevents the terminal bolt from being overtightened. By surrounding the battery cable terminal, the inventive cover reduces the exposure of the terminal to contaminants in the engine compartment and thereby reduces corrosion of the terminal. Furthermore, the cover can be secured to the battery cable terminal prior to installation in the vehicle and will remain secured during subsequent shipping and assembly procedures.

In the preferred form, the battery cable terminal cover has a base and a lid which are joined by an integrally molded hinge. The base and lid are pivotable about the hinge between an open and a closed position. The hinge is positioned diagonally between two adjacent sides of the cover, allowing easy access to either side of the battery cable terminal. A plurality of lock projections formed on the lid interact with corresponding retaining slots on the base to secure the lid to the base in the closed position. A handle formed on the lid assists the operator when pivoting the cover from the closed position to the open position.

An aperture is located in the base for receiving a battery post. The aperture is preferably of such diameter that the battery post will pass through the aperture, but creates a relatively close fit between the base and the battery post. This close fit prevents water, dirt and other contaminants from entering the cover through the aperture.

To secure the base to the cable terminal, a pair of parallel, resilient locking arms extend upwardly from the base of the cover in spaced relation to the aperture. Each locking arm contains a projection at the distal end which faces the other locking arm. The locking arms are spaced apart such that the terminal bolt will fit between the two arms. But, the spacing between the two projections is less than the diameter of the terminal bolt. Thus, the two locking arms must be deflected to allow the terminal bolt to slide past the projections.

In addition, a plurality of guide posts and resilient tabs are uniformly spaced around the aperture in the base. The posts are formed in the base and guide the battery cable terminal when being mounted to the base. Each tab includes a lock projection which extends outwardly from the tab and toward the aperture in the base. The resilient tabs receive the terminal flange and act to secure the terminal to the base. In the preferred form, three resilient tabs are positioned around the aperture in the base.

In the preferred form, the battery cable terminal is assembled to the cover using a single, rectilinear movement of the terminal toward the base. This rectilinear movement is well-suited for automated assembly procedures.

In the preferred assembly method, the battery cable terminal is mounted to the cover by first aligning the terminal aperture with the aperture in the base of the cover. The terminal is positioned such that the battery cable is aligned with the cable opening in the cover. The terminal is moved toward the base in a single, rectilinear movement. The terminal flange slides between the posts which extend from the base. As the flange begins to slide between the posts, the terminal bolt contacts the projection on each locking arm. Further urging of the terminal toward the base causes the locking arms to deflect away from one another, allowing the bolt to pass between the two projections. The locking arms then return to their original shape, maintaining the bolt between the two locking arms.

Urging of the terminal toward the base also causes the terminal flange to contact the lock projections on the resilient tabs located on the base. As the flange is urged against the lock projections, the resilient tabs are deflected outwardly, allowing the terminal to slide past the projections. As the flange passes the lock projections, the resilient tabs return to their original shape, securing the terminal to the base.

When the terminal is secured to the base, the pair of locking arms are located between the two ends of the split-ring terminal, thereby maintaining the ends of the split-ring terminal in a spaced apart relationship. The locking arms prevent the terminal from being deformed due to overtightening. The terminal bolt can be tightened, but the locking arms prevent the terminal ends from being tightened against each other. Therefore, the terminal is protected from damage or deformation due to overtightening.

After the terminal is secured to the base, the lid of the cover is be pivoted to the closed position, thereby surrounding and protecting the terminal. The lock projections on the lid engage the retaining slots on the base to secure the cover in the closed position. Once the cover is closed, the cover and terminal may be packaged and shipped to a vehicle assembly plant.

To release the cover from the closed position, the handle on the lid is lifted by the operator. As the handle is lifted, the lid is released from the base and pivots toward the open position.

To remove the terminal from the cover, the cover must first be in the open position. The terminal is pulled away from the base, releasing the resilient tabs and the locking arms located around the terminal bolt. The terminal can be repeatedly mounted to and released from the cover without damaging the cover or decreasing the ability of the terminal to be secured to the base. Furthermore, the cover may be repeatedly moved between the open and closed positions without damaging the cover or reducing the ability of the lid to be secured to the base.

BRIEF DESCRIPTION OF THE DRAWINGS

FIG. 2 is a top view of the battery cable terminal cover in the open position;

FIG. 3 is a top view of the battery cable terminal;

FIG. 7 is a perspective view of the battery cable terminal cover in the closed position;

FIG. 8 ms a perspective view of an alternate embodiment of the battery cable terminal cover, shown in the open position;

FIG. 9 is a top view of the alternate cover, shown in the open position;

DETAILED DESCRIPTION OF THE PREFERRED EMBODIMENT

Figure 1:
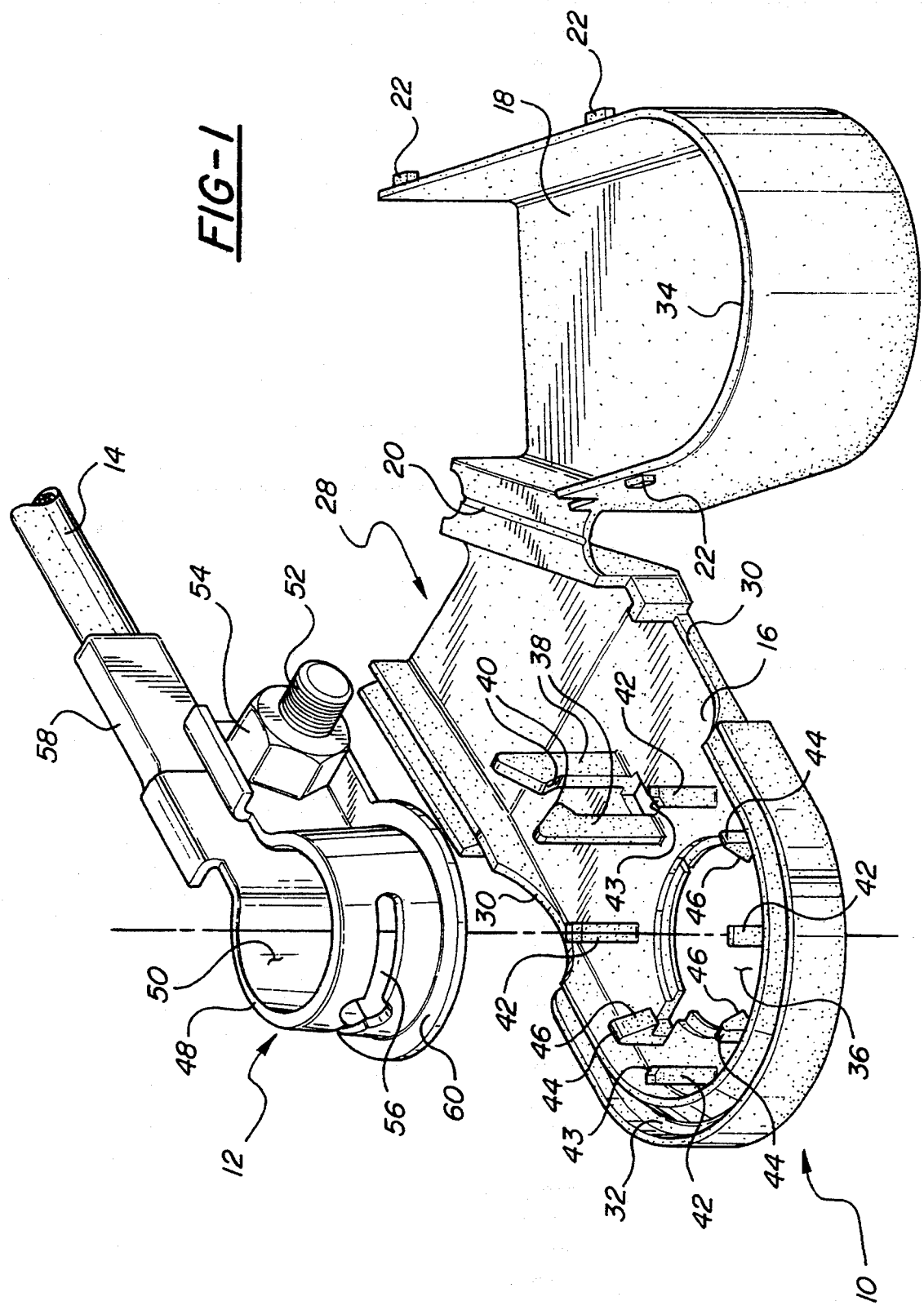
FIG. 1 is an exploded perspective view of the preferred embodiment of the battery cable terminal cover and the associated battery cable terminal.

Referring to FIG. 1, a cover 10 is shown in an open position. A stamped metal battery cable terminal 12 is attached to a battery cable 14. Cover 10 is adapted to receive terminal 12 and surround and protect the terminal when the cover is in a closed position (shown in FIG. 7).

Cover 10 includes a base 16 and a lid 18 which are attached to one another with a hinge 20. Hinge 20 is integrally molded between base 16 and lid 18, such that cover 10 is a single molded piece. Cover 10 is preferably manufactured using a plastic material such as polypropylene. Hinge 20 allows base 16 and lid 18 to be pivoted between an open position (shown in FIG. 1) and a closed position (shown in FIG. 7). Hinge 20 is positioned diagonally between adjacent sides of cover 10. Thus, when cover 10 is in the open position, access is provided to either side of terminal 12.

A peripheral channel 32 is located around the outer edge of base 16. Channel 32 is adapted to receive peripheral edge 34 of lid 18 when cover 10 is in the closed position.

Referring to FIG. 2, lid 18 includes a plurality of integrally molded lock projections 22 located on the outer edge of lid 18. Base 16 contains a plurality of retaining slots 24 formed in peripheral channel 32. Each retaining slot 24 aligns with a corresponding lock projection 22 when cover 10 is in the closed position. The interaction between each lock projection 22 and retaining slot 24 secures cover 10 in the closed position. In the preferred embodiment, lid 18 has three lock projections 22 and base 16 has three retaining slots 24. However, it will be understood that any number of lock projections 22 and retaining slots 24 may be used to secure lid 18 to base 16.

Lid 18 further includes an integrally molded handle 26 extending outwardly from the lid. Handle 26 provides a location for the user to grasp and lift cover 10, causing lid 18 to be released from base 16 and pivoted from the closed position to the open position.

Cover 10 includes an opening 28 adjacent hinge 20 for receiving battery cable 14. Lid 18 and base 16 taper toward cable 14, thereby reducing the size of opening 28. Opening 28 has a width less than the overall width of cover 10, and a height less than the overall height of the cover. Opening 28 is large enough to permit battery cable 14 to pass therethrough, and provides space for the battery cable to move within a restricted area. However, opening 28 is small enough to prevent most dirt, water, and other contaminants from entering cover 10 through the opening.

Depending on the particular application, letters, numbers or symbols can be molded into lid 18. As shown in FIG. 7, a positive symbol is molded into lid 18, indicating that the associated terminal 12 should be mounted to the positive battery post. Similarly, a negative symbol can be molded into lid 16. Furthermore, a company name, company logo, part number, assembly instructions, warnings, or any other text or symbol can be molded into lid 16 depending on the requirements of the particular application.

As shown in FIG. 1, a pair of recessed portions 30 are provided on opposite sides of cover 10. Recessed portions 30 allow access by users to terminal 12 while the terminal is mounted to base 16. For example, recessed portions 30 provide access for tools to tighten or loosen a terminal bolt 52 or nut 54. Thus, terminal bolt 52 and nut 54 may be operated while terminal 12 is secured to cover 10.

An aperture 36 is formed in base 16 for receiving a battery post (not shown). Aperture 36 has a diameter slightly larger than the diameter of the battery post to provide a close fit between cover 10 and the battery post. The close fit prevent contaminants from entering cover 10 through aperture 36.

A pair of resilient locking arms 38 are integrally molded to base 16. Locking arms 38 are positioned in a parallel, spaced apart relationship. The spacing between locking arms 38 is greater than the diameter of terminal bolt 52, allowing the bolt to pass between the locking arms. Each locking arm 38 contains an integrally molded locking projection 40 located at the distal end of the locking arm. Each projection 40 extends toward the opposing locking arm 38. The distance between projections 40 is less than diameter of bolt 52. Thus, projections 40 must be displaced to allow bolt 52 to pass therebetween.

As shown in FIGS. 1 and 3, terminal 12 is a stamped metal terminal having a split-ring configuration. Terminal 12 has a split-ring portion 48 with a substantially circular flange 60 extending outwardly from the peripheral edge of the split-ring portion. Split-ring 48 defines an aperture 50 with a variable diameter depending on whether the split-ring is compressed or uncompressed. As nut 54 is tightened on bolt 52, split-ring 48 is compressed, thereby reducing the diameter of the split-ring. When nut 54 is loosened from bolt 52, split-ring 48 returns to its original, uncompressed position (as shown in FIG. 3). In the uncompressed position, split-ring aperture 50 has a diameter approximately the same as the diameter of aperture 36 in base 16. Thus, in the uncompressed position, split-ring 48 can slide over the battery post (not shown).

Referring to FIG. 1, a plurality of posts 42 are integrally molded to base 16. Each post 42 contains an angled cam surface 43 at the distal end. Posts 42 are spaced such that terminal 12 will slide between the posts when being mounted to base 16. Cam surfaces 43 function to guide flange 60 between posts 42. Posts 42 act to align and guide terminal 12 onto base 16. In the preferred embodiment, four posts 42 are uniformly positioned around aperture 36. However, it will be understood that any number of posts can be used such that the posts guide terminal 12 onto base 16.

A plurality of resilient tabs 44 are integrally molded to base 16. Each tab 44 contains a projection 46 extending toward aperture 36. Tabs 44 are positioned such that terminal 12 fits tightly between the tabs. The distance between projections 46 is less than the diameter of flange 60, requiring displacement of tabs 44 to allow terminal 12 to pass between the tabs. In the preferred embodiment, three resilient tabs 44 are formed on base 16. However, it will be apparent to those skilled in the art that any number of resilient tabs may be used as long as the tabs secure terminal 12 to base 16.

A slot 56 is located in split-ring 48 and can have different shapes depending on whether the terminal is for the positive battery post or the negative battery post. Slot 56 shown in FIG. 1 contains a pair of recessed portions which give the appearance of a positive symbol. If slot 56 did not contain the recessed portions, it would have the appearance of a negative symbol. Therefore, a user can determine which battery post terminal 12 should be connected to merely by looking at slot 56.

A crimp tab 58 extends from split-ring 48 and functions to attach battery cable 14 to terminal 12. Crimp tab 58 can have a variety of configurations, as will be known to those skilled in the art.

Figure 4:
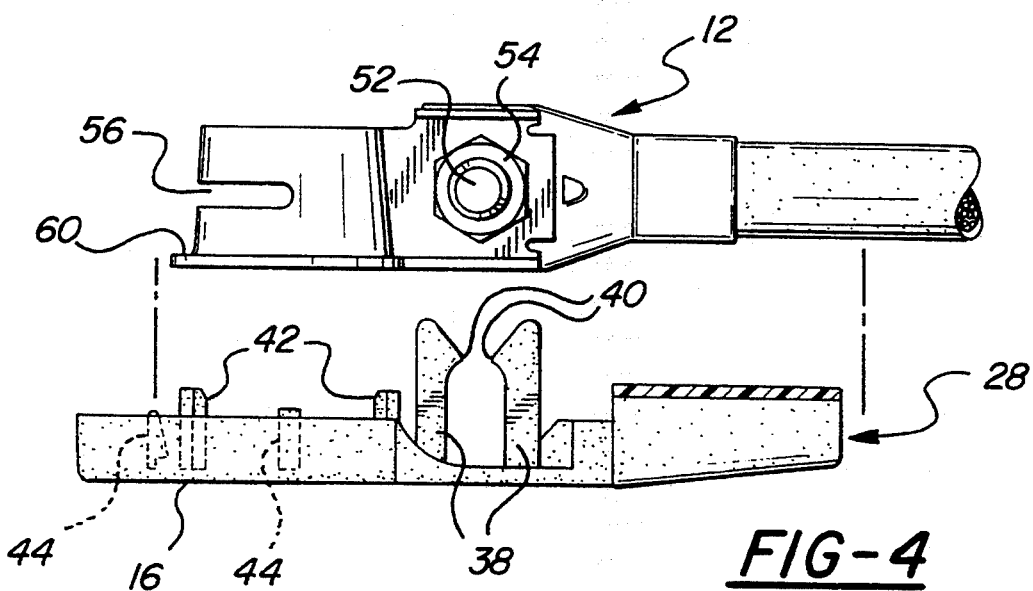
FIG. 4 is a side view of the battery cable is terminal detached from the cover.
Figure 5:
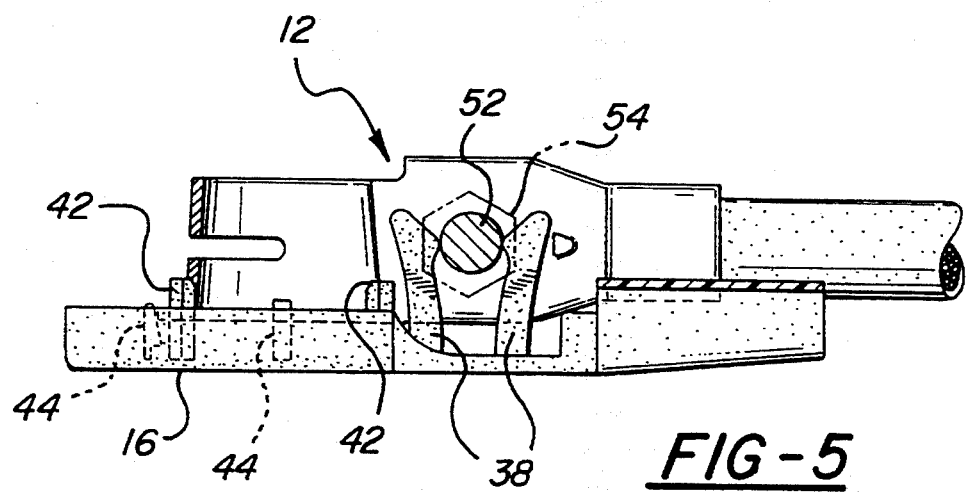
FIG. 5 ms a side view of the battery cable terminal partially attached to the cover.
Figure 6:
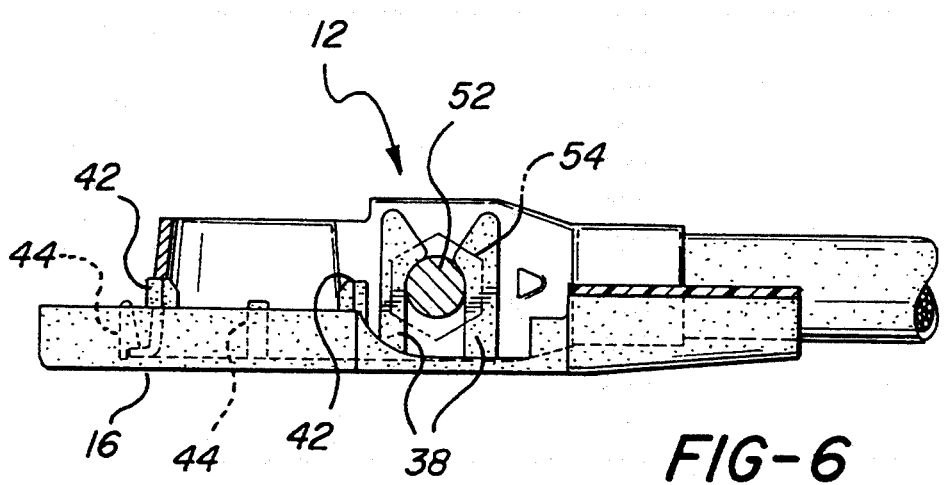
FIG. 6 ms a side view of the battery cable terminal attached to the cover.

In the preferred form, terminal 12 is mounted to cover 10 by first aligning the terminal with base 16. Referring to FIG. 4, terminal 12 is positioned such that bolt 52 is above the pair of locking arms 38, and battery cable 14 is above cover opening 28. As shown in FIGS. 4, 5 and 6, terminal 12 is moved toward base 16 using a single, rectilinear movement.

Referring to FIG. 5, as terminal 12 moves toward base 16, bolt 52 contacts the two projections 40 on resilient locking arms 38. As bolt 52 contacts projections 40, terminal flange 60 begins to slide between posts 42. Posts 42 act to guide and position terminal 12 on base 16.

As terminal 12 is further urged onto base 16, bolt 52 is urged against projections 40, causing locking arms 38 to deflect away from the bolt. As locking arms 38 deflect away from bolt 52, the bolt continues to slide between projections 40. When bolt 52 has passed the two projections 40, locking arms 38 return to their original shape, securing the bolt between the locking arms.

As bolt 52 slides between locking arms 38, flange 60 continues to slide between posts 42. As terminal 12 is further urged onto base 16, flange 60 is urged against lock projections 46 on resilient tabs 44, causing tabs 44 to deflect away from the flange. As tabs 44 deflect away from flange 60, the flange continues to slide along lock projections 46. When flange 60 has passed lock projections 46, tabs 44 return to their original shape, securing terminal 12 to base 16 (as shown in FIG. 6).

As best shown in FIG. 2, cover 10 is closed around terminal 12 by pivoting lid 18 about base 16 to the closed position. As lid 18 is pivoted, edge 34 enters channel 32 on base 16. The interaction between edge 34 and channel 32 ensures proper alignment of lid 18 with base 16, and acts to seal the connection of the lid to the base. As edge 34 is urged into channel 32, lock projections 22 engage retaining slots 24, thereby securing lid 18 to base 16 in the closed position. A perspective view of cover 10 in the closed position is shown in FIG. 7.

Once cover 10 is secured in the closed position, terminal 12 is protected from water, dirt, salt, and other contaminants found in the engine compartment. Additionally, cover 10 protects terminal 12 and the battery post from accidental contact and possible electrical shorting. Cover 10 also protects terminal 12 during shipment and prior to installation on the battery.

After cover 10 is closed, the terminal and cover assembly can be packaged for shipment to a vehicle assembly plant. Depending on the particular application, the terminal and cover may be packaged and shipped along with the entire battery cable wiring harness.

To open cover 10, a user grasps handle 26 and pulls the handle away from base 16. This causes lock projections 22 to disengage retaining slots 24, allowing lid 18 to pivot away from base 16 to the open position. With cover 10 in the open position, terminal 12 is accessible without having to remove the cover. Since hinge 20 is positioned diagonally, either side of terminal 12 is accessible with a tool or other device. Recessed portions 30 provide additional clearance for tools and the like.

To remove terminal 12 from cover 10, the terminal is pulled away from base 16, urging flange 60 against lock projections 46 on tabs 44. As flange 60 is urged against lock projections 46, tabs 44 are deflected away from the flange. As tabs 44 deflect away from flange 60, the flange moves past lock projections 46 and the tabs return to their original shape. At the same time, bolt 52 contacts projections 40 on locking arms 38. As terminal 12 is pulled away from base 16, locking arms 38 deflect away from bolt 52 allowing the bolt to slide along lock projections 40. When bolt 52 passes lock projections 40, locking arms 38 return to their original shape, and the bolt is released.

Terminal 12 can be repeatedly mounted to cover 10 and released without damaging the cover or decreasing the ability of base 16 to secure the terminal.

Referring to FIG. 8, an alternate embodiment of the battery cable terminal cover is shown. The alternate cover uses different mechanisms to secure terminal 12 to base 16 and to secure lid 18 to base 16 in the closed position. The same terminal 12 and battery cable 14 are used in the alternate embodiment. Cover 10 includes the same base 16, lid 18, hinge 20, handle 26, opening 28, and aperture 36 as discussed above. Base 16 also contains the same resilient locking arms 38 as described earlier. The alternate embodiment of base 16 includes a ridge 110 extending outwardly around the peripheral edge of the base. Ridge 110 interacts with a groove 112 formed on the periphery of the inner surface of lid 18.

Lid 18 is secured to base 16 by pivoting the lid from the open position to the closed position, causing ridge 110 to engage groove 112. The interaction between ridge 110 and groove 112 secures cover 10 in the closed position. To open cover 10, the user lifts handle 26 in the same manner as described earlier. Cover 10 can be repeatedly opened and closed without damaging the cover or decreasing the ability of ridge 110 and groove 112 to secure the cover in the closed position.

Although two different mechanisms for securing the lid to the base have been disclosed, those skilled in the art will understand that other structures can be used to perform the same function.

The alternate embodiment of cover 10 includes an arcuate rail 114 which is integrally molded to base 16 and which defines a slot 116 located near aperture 36. Slot 116 is adapted to receive flange 60 on terminal 12.

Figure 10:
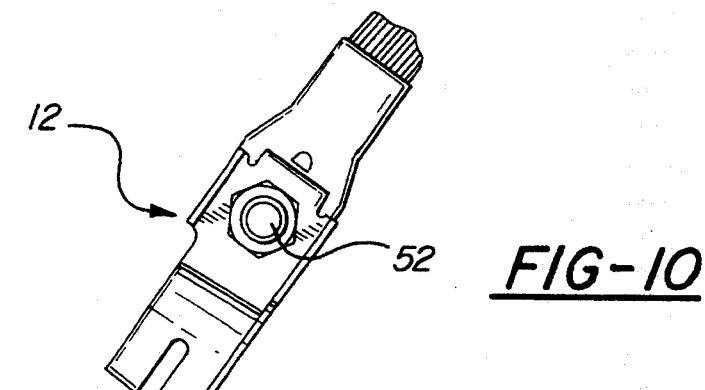
FIG. 10 is a side view of the battery cable terminal prior to attachment to the alternate cover.
Figure 11:
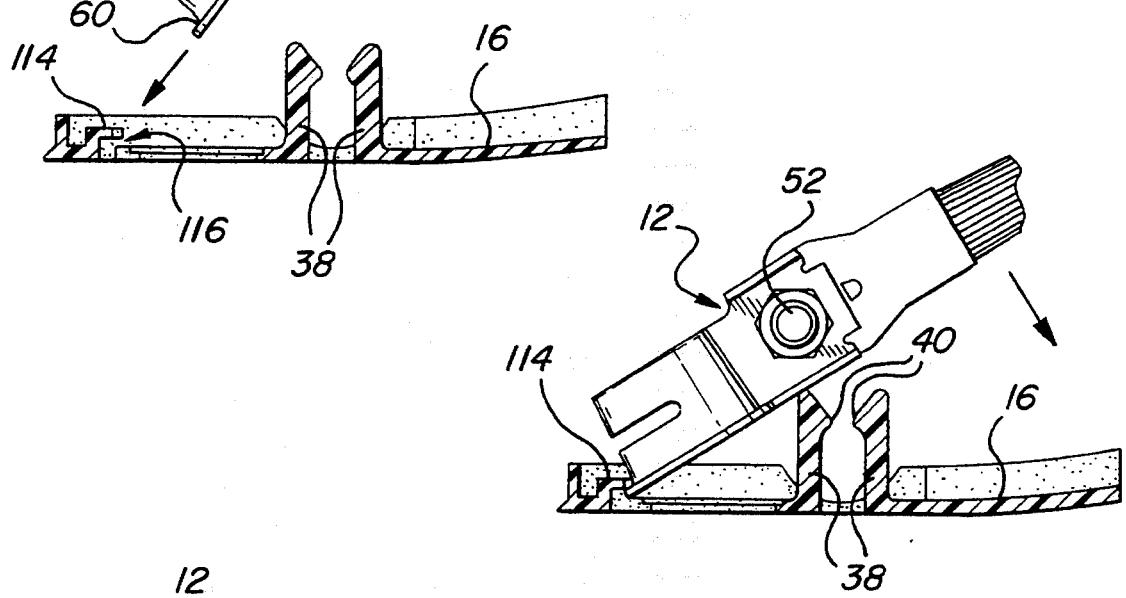
FIG. 11 is a side view of the battery cable terminal with one end engaging the alternate cover.
Figure 12:
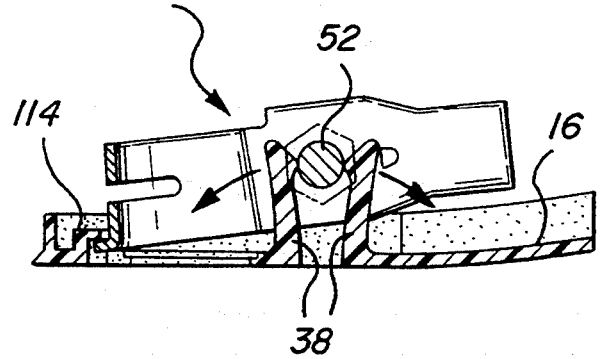
FIG. 12 is a side view of the battery cable terminal partially attached to the alternate cover.
Figure 13:
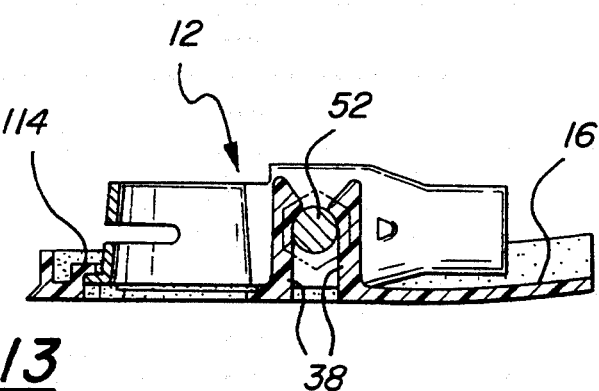
FIG. 13 is a side view of the battery cable terminal attached to the alternate cover.

Referring to FIG. 10, terminal 12 is mounted to the alternate embodiment of base 16 by positioning the terminal diagonally with respect to the base. Terminal 12 is moved toward base 16 such that flange 60 slides into slot 116, as shown in FIG. 11. Slot 116 guides and positions terminal 12 such that aperture 50 in the terminal aligns with aperture 36 in base 16. Next, terminal 12 is pivoted such that bolt 52 moves toward locking arms 38. As shown in FIG. 12, bolt 52 contacts projections 40 on locking arms 38. As terminal 12 is urged toward base 16, locking arms 38 deflect away from bolt 52, allowing the bolt to pass between projections 40. As bolt 52 passes projections 40, locking arms 38 return to their original shape, securing the bolt between the locking arms, as shown in FIG. 13.

To release terminal 12 from the alternate cover, the terminal is pivoted such that bolt 52 moves away from base 16. As bolt 52 is pulled away from base 16, the bolt contacts projections 40, causing locking arms 38 to deflect away from the bolt. As bolt 52 passes projections 40, locking arms 38 return to their original shape. When bolt 52 is released from locking arms 38, terminal 12 can be pulled away from base 16, removing flange 60 from slot 116.

Terminal 12 can be repeatedly mounted to cover 10 and released without damaging the cover or decreasing the ability of the cover to secure the terminal.

We claim:

1. A cover securable to a split-ring, flanged battery cable terminal having a bolt for adjusting the size of said split-ring, said cover comprising:
   a base having an aperture adapted to receive a battery post;
   a lid adapted to mate with said base;
   a hinge connecting said lid to said base, said hinge allowing said lid to pivot about said base between an open position and a closed position;
   a pair of parallel, spaced apart resilient locking arms formed on the base to receive said terminal bolt therebetween;
   a plurality of resilient tabs formed on said base and located around and adjacent the aperture in said base, said resilient tabs adapted to receive and releasably, lockingly engage said terminal flange; and
   means for securing said lid to said base over said terminal in the closed position.

2. The apparatus of claim 1 wherein the means for securing said lid to said base comprises a plurality of lock projections extending outwardly from said lid and registrable with a plurality of retaining slots on said base.

3. The apparatus of claim 1 wherein the means for securing said lid to said base comprises a ridge on the peripheral edge of said base adapted to engage a groove on the peripheral edge of said lid.

4. The apparatus of claim 1 wherein said base further includes a channel around the peripheral edge of said base for receiving said lid.

5. The apparatus of claim 1 wherein said lid further includes a handle for moving said lid from the closed position to the open position.

6. The apparatus of claim 1 wherein said cover defines an opening for routing the battery cable therethrough.

7. The apparatus of claim 6 wherein said opening has a width less than the overall width of said cover and a height less than the overall height of said cover.

8. The apparatus of claim 1 wherein said hinge is positioned diagonally between adjacent sides of said cover.

9. The apparatus of claim 1 wherein said base further includes a pair of recessed portions to provide access to said battery cable terminal.

10. The apparatus of claim 1 wherein each locking arm has a proximate end and a distal end, each locking arm includes a projection extending outwardly from the distal end of the locking arm, said locking arm projection extending toward the other locking arm.

11. The apparatus of claim 10 wherein the spacing between said locking arm projections is less than the diameter of said terminal bolt.

12. The apparatus of claim 1 further including a plurality of posts formed on the base, said posts being uniformly spaced around said aperture in the base.

13. The apparatus of claim 1 wherein each resilient tab has a proximate end and a distal end, each resilient tab includes a projection extending outwardly from the distal end of the tab, said tab projection extending toward the aperture in the base.

14. A cover securable to a battery cable terminal, said battery cable terminal having a split-ring configuration and securable to a battery post, said battery cable terminal including a substantially circular peripheral flange and a bolt for compressing said split-ring, said cover comprising:

a base having an aperture adapted to receive said battery post;

a lid adapted to substantially cover said base;

a hinge connecting said lid to said base, said hinge allowing said lid to pivot about said base between an open position and a closed position;

a pair of parallel, spaced apart resilient locking arms formed on the base, said locking arms adapted to receive said terminal bolt;

an arcuate rail formed on the base, said arcuate rail defining a slot adapted to receive said terminal flange; and means for securing said lid to said base in the closed position.

15. The apparatus of claim 14 wherein the means for securing said lid to said base comprises a plurality of lock projections extending outwardly from said lid and registrable with a plurality of retaining slots on said base.

16. The apparatus of claim 14 wherein the means for securing said lid to said base comprises a ridge on the peripheral edge of said base adapted to engage a groove on the peripheral edge of said lid.

17. The apparatus of claim 14 wherein said base further includes a channel around the peripheral edge of said base for receiving said lid.

18. The apparatus of claim 14 wherein said lid further includes a handle for moving said lid from the closed position to the open position.

19. The apparatus of claim 14 wherein said cover defines an opening for routing the battery cable therethrough.

20. The apparatus of claim 19 wherein said opening has a width less than the overall width of said cover and a height less than the overall height of said cover.

21. The apparatus of claim 14 wherein said hinge is positioned diagonally between adjacent sides of said cover.

22. The apparatus of claim 14 wherein said base further includes a pair of recessed portions to provide access to said battery cable terminal.

23. The apparatus of claim 14 wherein each locking arm has a proximate end and a distal end, each locking arm includes a projection extending outwardly from the distal end of the locking arm, said locking arm projection extending toward the other locking arm.

24. The apparatus of claim 23 wherein the spacing between said locking arm projections is less than the diameter of said terminal bolt.

* * * * *